July 29, 1941.  C. F. ERNST  2,250,577
CONTAINER HANDLING DEVICE
Filed July 30, 1940  5 Sheets-Sheet 1
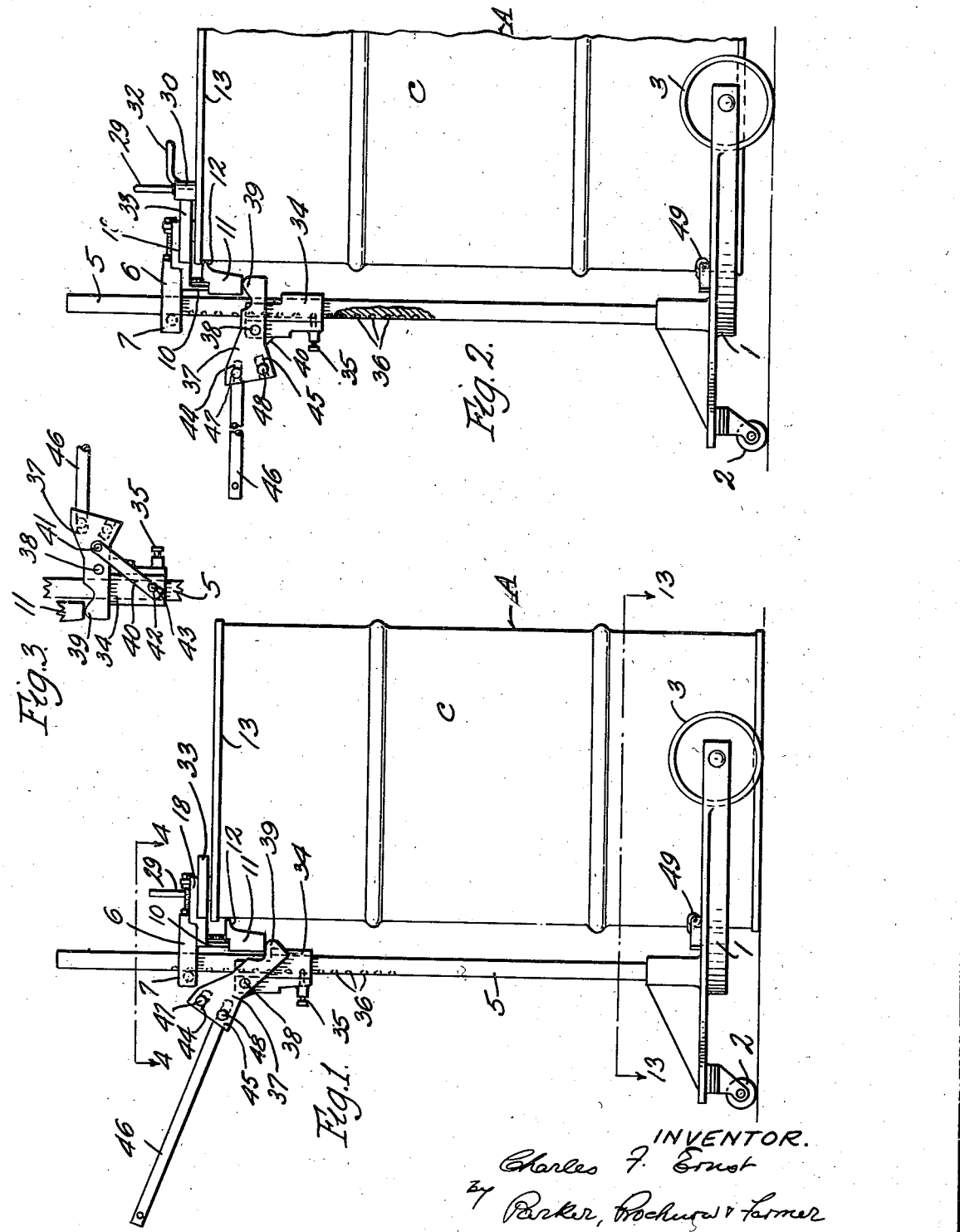
INVENTOR.
Charles F. Ernst
By Parker, Rockwell & Farmer
ATTORNEYS.

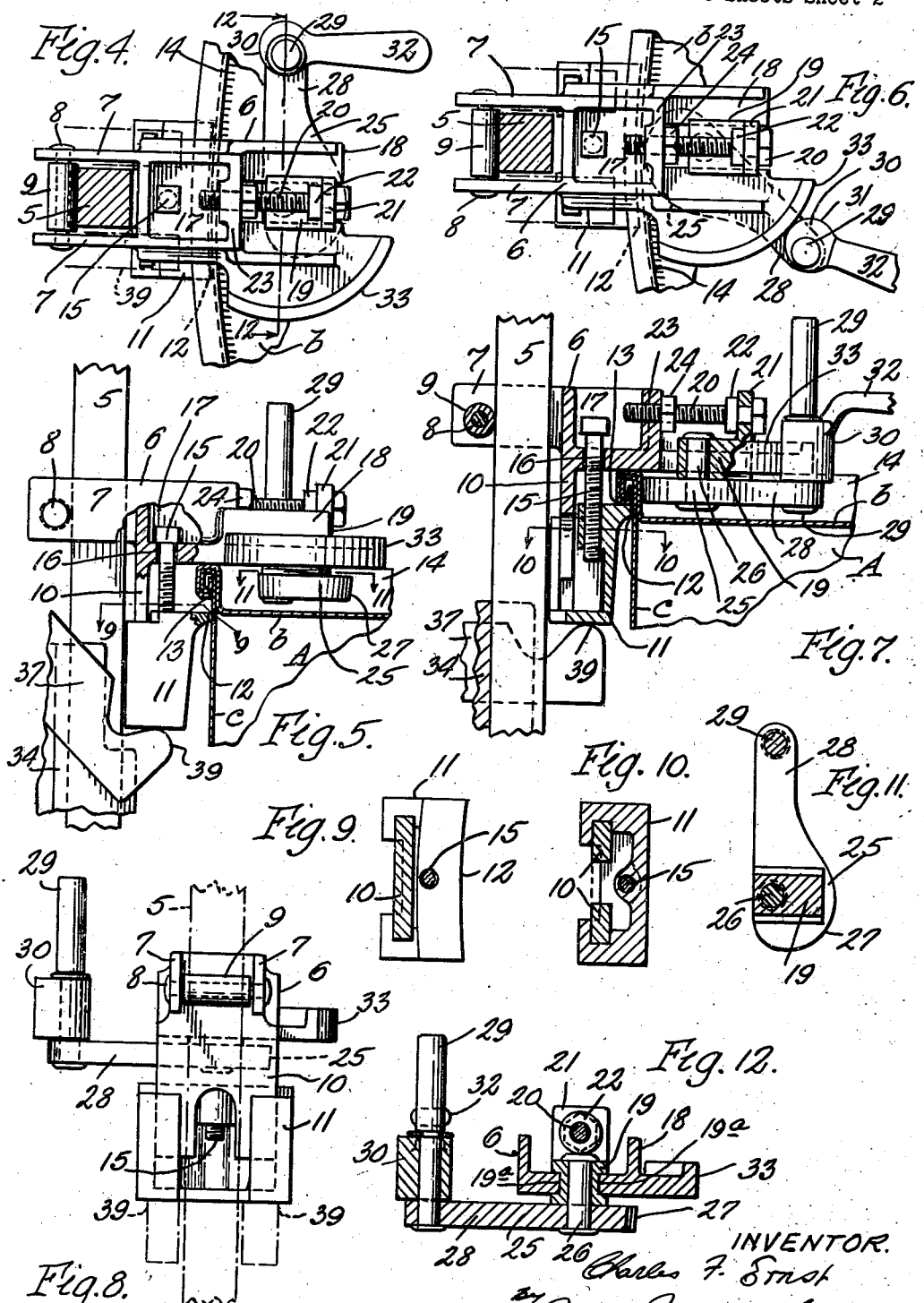

July 29, 1941.  C. F. ERNST  2,250,577
CONTAINER HANDLING DEVICE
Filed July 30, 1940  5 Sheets-Sheet 3
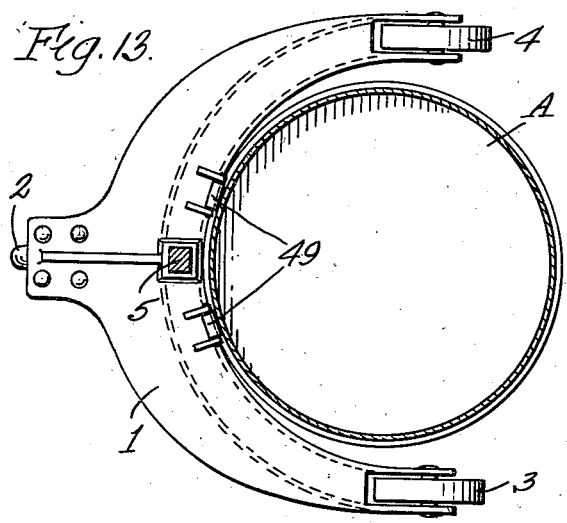
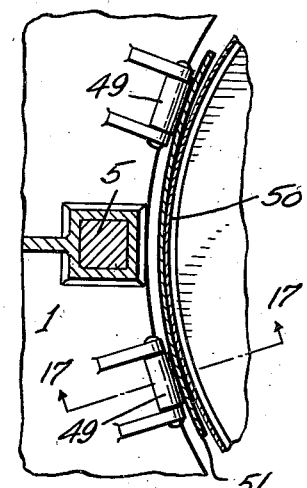
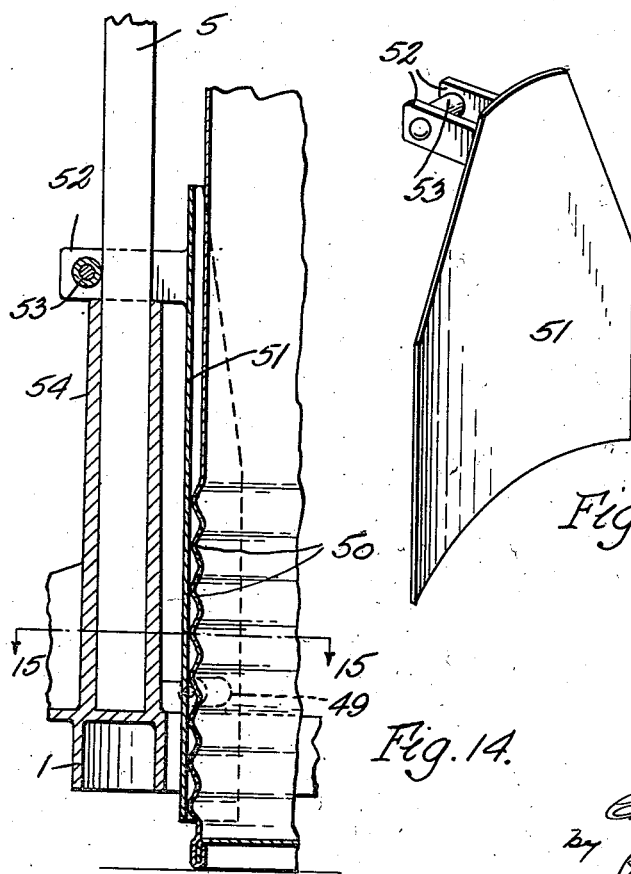
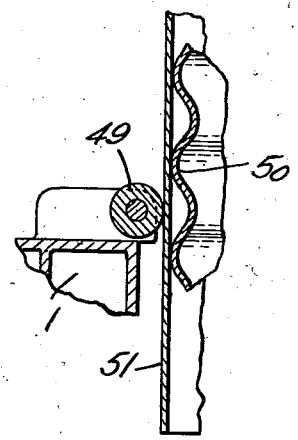
INVENTOR.
Charles F. Ernst,
by Parker, Brockhurst & Farmer.
ATTORNEYS July 29, 1941.    C. F. ERNST    2,250,577
CONTAINER HANDLING DEVICE
Filed July 30, 1940    5 Sheets-Sheet 4
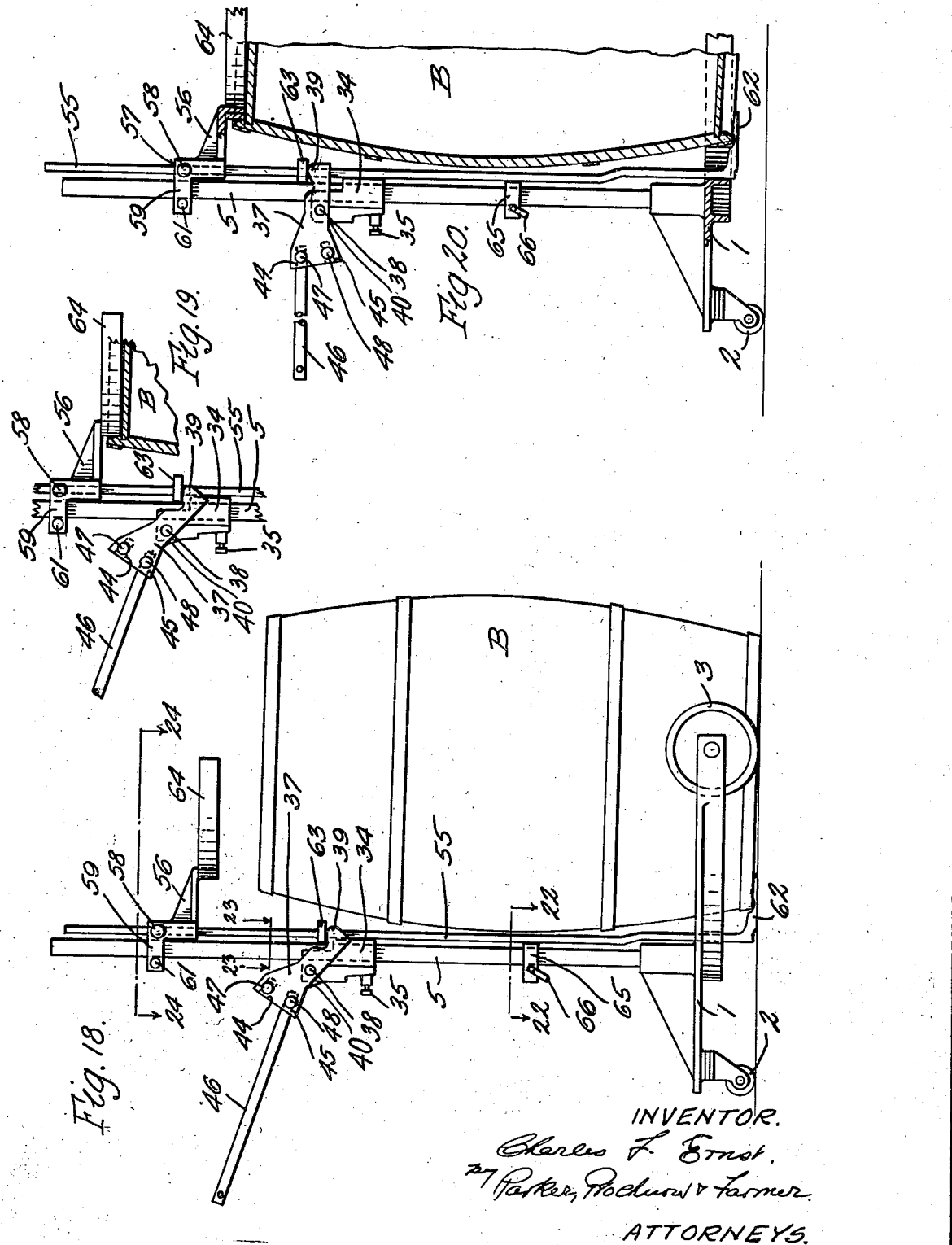
INVENTOR.
Charles F. Ernst.
By Parker, Rockwood & Farmer
ATTORNEYS.

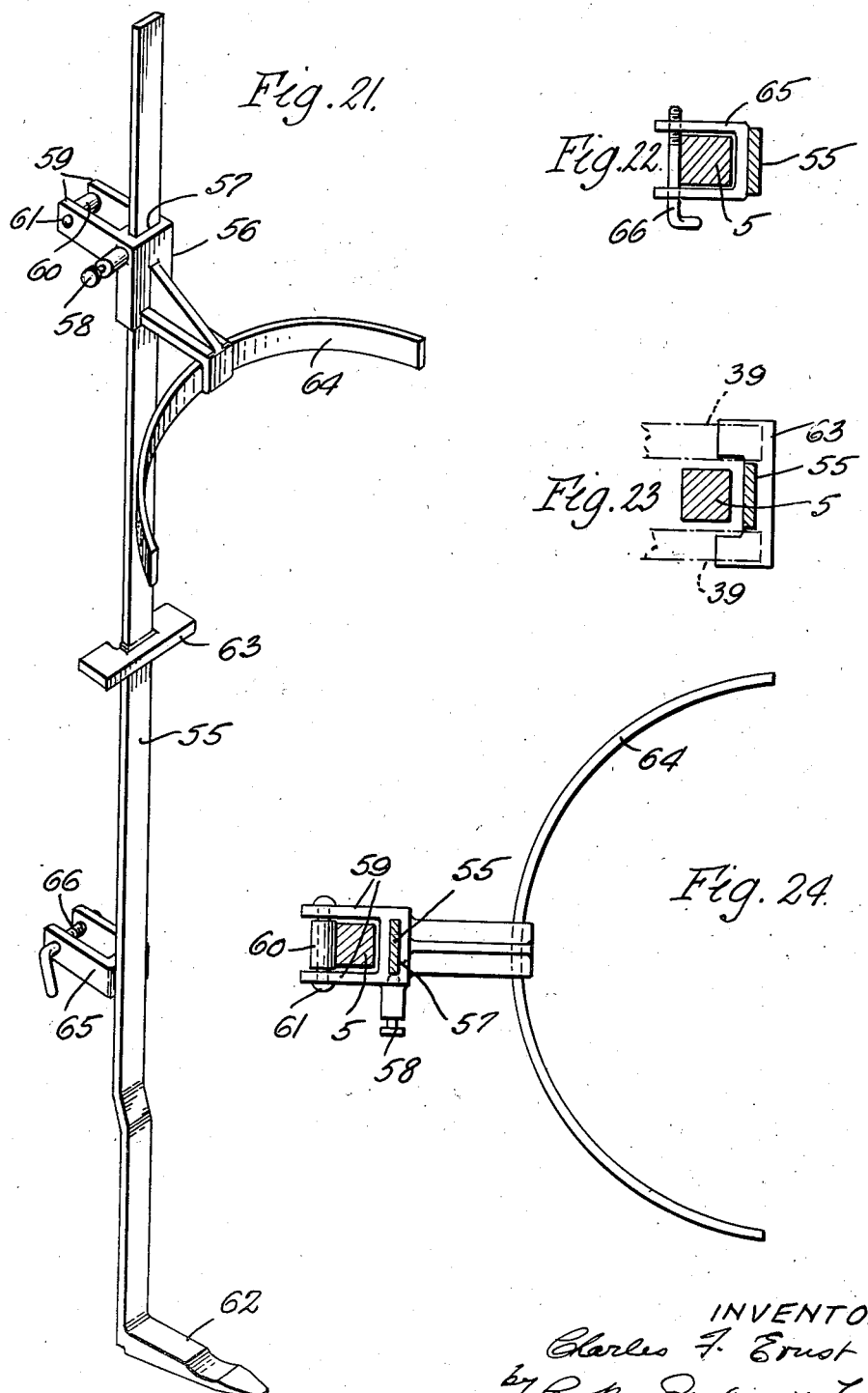

Patented July 29, 1941

2,250,577

UNITED STATES PATENT OFFICE 2,250,577

CONTAINER HANDLING DEVICE

Charles F. Ernst, Buffalo, N. Y.

Application July 30, 1940, Serial No. 348,334

20 Claims. (Cl. 254—8)

This invention relates to container handling devices and more particularly to devices for transporting rigid containers such as barrels, drums and the like.

One object of this invention is to improve or simplify means for handling and moving barrels, drums and other rigid containers from one location to another.

Another object of this invention is to provide an improved truck or vehicle for moving relatively rigid containers from one location to another, by which danger of rupture, sprains and bodily injuries to the operator will be eliminated, by which the movement of containers handled during a working period may be increased without increasing fatigue of the operator, by which hand moving or tipping of the containers is rendered unnecessary, which will handle a wide variety of types and sizes of containers whether open or closed, by which open, upright containers may be easily and quickly moved from one location to another without spilling of the contents, which will be self-balancing, self-leveling, stable, easy rolling and will not injure the floor over which the containers are moved, by which danger to the containers due to handling will be reduced and which will be relatively simple, convenient, compact, durable and inexpensive.

Other objects and advantages will be apparent from the following description of two embodiments of the invention, and the novel features will be particularly pointed out hereinafter in connection wtih the appended claims.

In the accompanying drawings:

Fig. 1 is a side elevation of an improved truck constructed in accordance with one form of this invention, and showing the parts in position to grip and lift a container such as a metal cylindrical drum;

Fig. 2 is a side elevation of the same, but showing the position of the parts after the improved device has gripped and lifted the container;

Fig. 3 is a side elevation, from the opposite side, of a portion of the lifting means of Fig. 2 and showing the manner in which the lever is latched in the position it occupies after a container has been gripped and lifted;

Fig. 4 is a sectional plan of a portion of the same, the section being taken approximately along the line 4—4 of Fig. 1 and illustrating the position of the parts just before gripping a container;

Fig. 5 is a sectional elevation through the mechanism of Fig. 4;

Fig. 6 is a sectional plan similar to Fig. 4 but with the parts moved into gripping relation to a container;

Fig. 7 is a sectional elevation through the mechanism of Fig. 6;

Fig. 8 is a rear elevation of a portion of the mechanism of Fig. 1 and representing the container gripping unit;

Fig. 9 is a sectional plan through a portion of the container gripping unit, the section being taken approximately along the line 9—9 of Fig. 5;

Fig. 10 is another sectional plan of the same, but with the section taken approximately along the line 10—10 of Fig. 7;

Fig. 11 is a sectional plan through a portion of the flange gripping mechanism of the container gripping unit, the section being taken approximately along the line 11—11 of Fig. 5;

Fig. 12 is a sectional elevation through the flange gripping mechanism, the section being taken approximately along the line 12—12 of Fig. 4;

Fig. 13 is a sectional plan through another portion of the device, the section being taken approximately along the line 13—13 of Fig. 1;

Fig. 14 is a sectional elevation of the same;

Fig. 15 is a section plan of the same, with the section taken approximately along the line 15—15 of Fig. 14;

Fig. 16 is a perspective of a guard or apron that may be employed on the device when containers having undulatory peripheries are to be transported;

Fig. 17 is a sectional elevation through a portion of the device shown in Figs. 14 to 16, with the section taken approximately along the line 17—17 of Fig. 15;

Fig. 18 is a side elevation of another embodiment of the invention, adapted for the handling of a different type of container;

Fig. 19 is a side elevation of part of the mechanism shown in Fig. 18, but illustrating a different position of the flange engaging element;

Fig. 20 is a side elevation similar to Fig. 18, but with the barrel and the flange engaging means in section and with the barrel in gripped and lifted position;

Fig. 21 is a perspective of the container gripping and lifting unit of Figs. 18 to 20;

Fig. 22 is a sectional plan through a portion of the mechanism, the section being taken approximately along the line 22—22 of Fig. 18;

Fig. 23 is another sectional plan of the portion of the same, the section being taken approximately along the line 23—23 of Fig. 18; and Fig. 24 is another sectional plan of the same, the section being taken approximately along the line 24—24 of Fig. 18.

In the embodiment of the invention illustrated in Figs 1 to 14 inclusive, the improved device includes a base 1, which is supported at its forward end by a pair of aligned rollers 3 and 4 and adjacent its rear end and in approximately the center thereof, by a swivel mounted, roller caster 2. The base 1 at its forward end is of U shape and the rollers 3 and 4 are at the free ends of the arms of the U shown in Fig. 13. The base 1 is also provided with an upstanding frame or structure 5 which, in the illustrated example, is in the nature of a post which is rigidly fixed to the base 1, and the post rises close to the rear of the base of the U so that when a container A is embraced or received within the opening of the U of the base as shown in Figs. 1, 2 and 13, the post or frame 5 will extend upwardly in reasonably close proximity to the adjacent wall of the container A as shown clearly in Figs. 1, 2 and 13. The aligned axes of rollers 3 and 4 are preferably in a vertical plane forwardly of a vertical line dropped from the center of gravity of the container, so that the loaded truck will be in stable equilibrium. Since the mass is usually uniform across the container, this means that the arms of the U extend more than half way past the container.

The container engaging and lifting unit includes a member 6 which has a pair of rearwardly extending spaced arms 7 (Figs. 4 to 7) which pass along the opposite sides of the post 5, the post 5 being, for example, a column of square or rectangular cross section, and the free ends of the arms 7 are connected by a pivot pin 8 which rotatably mounts, between the arms 7, an antifriction roller 9. This roller 9 rolls against the rear face of the frame or standard 5, and with the arms 7 confines the unit 6 on the post 5 and guides it vertically thereon. The member 6 is provided with a depending arm 10 (Figs. 5 and 7) which is disposed between the standard or frame 5 and the container. A container engaging member 11 is slidingly mounted on the depending arm 10 so as to move vertically toward and from the member 6. The member 11 (Figs. 5 to 10) has a forwardly extending nose 12 at its upper end, which projects into a position beneath a shoulder 13 that faces downwardly and outwardly and is formed by the seam at the junction of the top b with the side wall c of the container A, it being understood that the top b and side wall c meet and extend vertically for a short distance before being rolled to form the seam, so as to also provide an inwardly facing flange 14 at the top of the container. The flange 14 as well as the shoulder 13 both extend peripherally around the container.

A cap screw 15 is passed loosely through a hole or aperture 16 in the member 6 and threaded into the upper end of the member 11, so that when the screw 15 is rotated it will, because of its threaded connection to the member 11, shift the latter vertically on the depending arm 10, it being understood that the member 11 acts as a nut for the cap screw and is held against turning with the cap screw by reason by the sliding engagement between the member 11 and the arm 10. The head of the cap screw 15 rides upon the bottom wall of a recess or cavity 17 in the member 6 and by reason of the weight of the member 11, the head of the cap screw is normally held downwardly against the bottom by the weight of the member 11. The member 6 also has a forwardly extending arm 18 (Figs. 4 to 7), bifurcated at its free end, which receives and slidingly mounts a member 19. This member 19 has grooves 19a (Fig. 12) running lengthwise along opposite sides thereof for receiving the end of the arm 18 along the slot of the bifurcation.

A screw 20 is rotatably mounted in an aperture in an upstanding flange 21 on the member 19, the head of the screw engaging against one side of the flange 21, and a collar 22 being fixed, such as by welding, on the screw 20 at the opposite face of the flange 21, so that while the screw 20 may rotate in its bearing in the flange 21, it is held against endwise movement in either direction through the flange 21. The screw 20 is threaded through an upstanding flange 23 on the forwardly extending arm 18, so that when the screw 20 is rotated, it will thread itself through the flange 23 in one direction or the other depending on the direction of rotation of the screw 20, and since the screw cannot move endwise in flange 21, its rotation will shift the mounting member 19 forwardly and rearwardly of the arm 18, that is toward and from the center of the container A over which the arm 18 is disposed. A lock nut 24 on screw 20 enables one to lock the screw against unintentional rotation after the screw has been adjusted into a desired position for a particular type and size of container.

An eccentric cam 25 (Figs. 4 to 12) is pivoted to the under face of the member 19 by a pivot pin 26, the pin being disposed eccentrically of the arcuate cam surface 27 on the cam 25. The cam 25 has an operating arm 28 extending radially therefrom and beyond the free end of the arm 18. At its free end this arm 28 carries an upstanding handle pin 29, and on this upstanding pin is confined another, smaller eccentric cam 30. The cam 30 is rotatably mounted on the upstanding pin 29, with the pin 29 eccentric to the cam surface 31 of the cam 30. The cam 30 is held against vertical movement on the pin 29 in any suitable manner such as by providing an annular groove in the pin 29 just above the upper face of the cam 30, and disposing in this annular groove a split ring which slightly overhangs the cam 30 and locks the cam against removal from the pin 29. The pin 29 extends some distance above the cam 30, so as to serve as a handle by which the arm 28 may be rotated to carry the cam surface 27 into and out of clamping engagement with the inner face of the upstanding flange 14 at the top of a container A.

The cam 30 also has an operating arm 32 by which it may be rotated on the pin 29. The arm 18 is provided with an arcuate, upstanding flange 33, having an outer face running along the path of travel of the pin 29 as the cam 25 is rotated about the pin 26. After the cam 25 has been rotated into engaging position with the flange 14 of the container A, the cam 30 may be rotated by its arm 32 so as to carry the cam surface 31 into contact with the arcuate flange 33 and thus lock the arm 28 of the cam 25 against movement in either direction. It will be noted from Fig. 6 that to lock the cam 30 against the flange 33, the arm 32 is rotated counter-clockwise in Fig. 6, in order to carry the cam surface 31 against the flange 33. When the cam surface 31 is thus engaged with the flange 33, any forces tending to move the cam 25 counter-clockwise in Fig. 6, which would be in a direction to release the flange 14 of the container A, would tend to rotate the cam 30 into tighter locking engagement with the flange 33 because the cam surface 31 is further from the pin 29 as it progresses clockwise on the cam in Fig. 6.

The member 6, because of its sliding engagement on the post or frame 5, tends to descend when released, and as the device is moved into embracing relation with a container A, as shown in Fig. 1, the member 6 is lifted so that the cam 25 on the lower face of the arm 18 will clear the top of the flange 14, and just as soon as the cam 25 has passed the flange 14, the member 6 is released so as to descend and carry the nose 12 of the member 11 downwardly into a position, such that it will move freely beneath the shoulder 13 of the container as the device continues its movement toward the container A. This carries the nose 12 beneath the shoulder 13 on the external periphery of the container A, with the parts as shown in Figs. 1, 4 and 5. It is understood that during this movement the arm 28 of the cam 25 is in the inactive position shown in Figs. 1, 4 and 5.

The screw 20 is, of course, adjusted to shift the cam 25 with the mounting member 19 toward and from the post 5 into such a position that while the cam 25 normally clears the flange 14 as the device moves into receiving position with respect to the container, it is nevertheless sufficiently close to the flange 14 so that when the arm 28 is rotated from the position shown in Fig. 4 to the position shown in Fig. 6, the cam surface 27 of the cam 25 will be carried into engagement with the flange 14 at a point nearest the post 5, as shown in Figs. 6 and 7. After the cam engaging unit so slidingly mounted on the post 5, is moved into the position shown in Figs. 4 and 5, and the cam 25 forced against the inner face of the flange 14, the entire container 5 may be lifted by a mechanism which will now be described.

Referring now particularly to Figs. 1 to 3, a sleeve 34 is slidably mounted on the post or frame 5 and is releasably held in different adjusted vertical positions thereon in any suitable manner, such as by a spring pressed plunger 35 carried by the sleeve and engageable in any of a plurality of notches or recesses 36 formed in that face of the post or frame 5 along which the spring pressed plunger 35 moves as the sleeve is shifted vertically. When the plunger 35 is released, its spring is urged towards the post 5 and into that notch 36 into alinement with which it first moves after release, and this definitely locks the sleeve against further vertical movement until the plunger 35 is pulled outwardly. A lever 37 is pivoted at 38 on the sleeve 34. The lever 37 is bifurcated at one end so as to straddle opposite sides of the sleeve 34, and its arms, formed by the bifurcation, are hinged by the pin 38 to the sleeve 34. The arms of the lever 37 extend past the post 5 and at their ends have cam noses or surfaces 39 which engage beneath the bottom of the member 11, so that when the lever 37 is rocked counter-clockwise in Fig. 1, the cam ends of the arms of the lever will, by engagement with the lower end of the member 11, first shift the member 11 upwardly until the nose 12 engages the shoulder 13, this being permitted by the idle upward movement of the cap screw 15 in the opening 16, and then, upon further rocking of the lever, will lift the container A upwardly off of the floor, as shown in Fig. 2. A latch lever 40 is pivoted on the lever 37 at 41, and is provided with a notch 42 which is releasably engageable over a pin 43 carried on a side of the sleeve 34, when the lever is in its approximately horizontal or container lifted position shown in Figs. 2, 3, and 20. The other end of the lever 37 is provided with a pair of sockets 44 and 45 which extend somewhat radially toward the pivot pin 38 and have their longitudinal axes diverging from one another outwardly. A handle 46 is selectively insertible alternately into the sockets 44 and 45 and is releasably held in each of these sockets when placed therein, by spring pressed pins 47 and 48 carried by the lever and engageable in recesses or notches in the side of the handle 46. At the start of the lifting operation, the handle 46 is inserted in the lower socket 45, as shown in full lines in Fig. 1, so as to be convenient for rocking the lever 37 and lifting the container A. After the container A has been lifted into the position shown in Fig. 2, the handle 46, which would then be in a downwardly and rearwardly inclined position, is removed from the socket 45 and inserted in the socket 44, as shown in Figs. 2 and 3, so as to extend approximately horizontally. When so extended, the handle 46 is conveniently positioned to serve as a medium by which the truck and container carried thereby can be pulled along over the floor from one location to another.

Mounted on the base along the inside of the U and on opposite sides of the frame or standard 5, are rollers 49. These rollers are supported for rotation about approximately horizontal axes, and are disposed to slightly overhang the base of the U on the inside so that when the container A is in embraced relation thereto and is lifted, the rollers 49 will engage the container and reduce the friction caused by the dragging of the container upwardly against the base of the U.

In some instances the containers to be handled are provided in their side walls adjacent their lower ends with undulations or corrugations 50, Figs. 14 and 17, and such an external undulatory surface on the side wall of a container in riding against the rollers might create objectionable resistance to lifting of the container and, therefore, whenever the device is to be used to transport containers having such undulatory side walls, I prefer to first mount on the post 5 an arcuate apron or shield 51 (Fig. 16) which is provided with two rearwardly extending lugs 52 that rotatably support a roller 53 adjacent their free ends. The sleeve 34 and the member 6 are first removed from the post 5, after which the shield is placed down over the post 5, with the post 5 passing between the arms 52 and between the roller 53 and the shield plate, as shown in Figs. 14, 15 and 17. The lugs 52 are disposed to rest upon the tubular portion 54 on the base from which the post 5 extends, and if the tubular part 54 of the base is not high enough, a collar or bushing (not shown) may be placed over the post 5 so as to rest upon the tubular portion of the base and form an abutment on which the arms 52 may rest. The shield 51 extends downwardly past the rollers and the container with the corrugated surface then slides against the face of the apron or shield, the rollers 49 being merely inactive for the time being.

Referring now to the embodiment of the invention shown in Figs. 18 to 24, the improved device is shown as adapted for the handling of containers of a different type and construction, this different type of container being of the bulged center or barrel type and designated by the reference character B. The mechanism of the transporting device is the same for Figs.

1–14 inclusive, except for a modification in the container-engaging and lifting unit, which is slidable on the upright frame or post 5. Parts shown in the embodiment of Figs. 18–24, which correspond to similar parts in Figs. 1–14, bear corresponding reference numerals, and will not be again described. This modified container-engaging and lifting unit includes an L-shaped bar or lifting member 55 which is disposed in an upright position, with the stem of the L disposed adjacent the upstanding frame or post 5.

A member or element 56 has a vertical passage or socket 57 (Figs. 21 and 24) which slidingly receives the upper end of the bar 55, so that member 56 may move upwardly and downwardly thereon, such movement being normally hindered by friction created by a spring pressed plunger or brake 58 which is carried by the member 56 and bears against an edge of the bar 55. The member 56 also has a pair of rearwardly extending, spaced parallel arms 59 which pass along opposite sides of the frame or post 5 and at their free ends rotatably support a roller 60 by means of a pivot pin 61. This roller 60 rolls along the rear face of the frame or post 5 so as to reduce friction and prevent binding, and the eye formed by the arms or lugs 59 and the roller 60 guides this container-engaging and lifting unit for vertical movement on the frame or post 5.

The bar 55 adjacent its lower end descends along the inner face of the U of the base and the bottom 62 of the L is tapered toward its free end. The bar 55 at its lower end rests upon or is held in close proximity to the floor on which the base rolls, so that when the device is pushed into embracing relation with a container B this tapered foot may be also easily pushed or wedged at the same time and by the same movement under the bottom edge of a barrel or container B, as shown in Fig. 18, which bottom edge forms a downwardly and outwardly facing peripheral shoulder corresponding to the shoulder 13 of Figs. 1 to 17. The bar 55, intermediate its ends is provided with a cross plate or abutment 63, which is engaged by the bifurcated cam ends 39 of the lever 37, so that by rocking the lever 37 the bar 55 will be engaged and lifted, and through the base arm 62, will lift the container B. The member 56 projects in a direction forwardly and away from the frame or post 5, and has depending therefrom an arcuate flange engaging element 64 which is lowered against the top of the barrel B, or within the upper end thereof, or within the inside of the upstanding flange on the top of the barrel, by sliding the member 56 downwardly on the bar 55 after the device has been pushed into embracing relation to the barrel B, as shown in Fig. 18. This lowered position of the member 56 is shown in Figs. 19 and 20, and when the lever 37 is rocked to lift the container, the holding member 64 will be elevated with the bar 55, and hence with the container, the two moving up together, as shown in Fig. 20.

In order to confine the bar 55, near its bottom, to post 5, I secure to the rear face of the bar, some distance above its bottom, a U-shaped element 65, which at its open end straddles the post 5, as shown in Figs. 18, 20 and 22. The free ends of the arm of the U of the member 65 are connected by a removable screw 66 which passes slidably through an aperture in one of the arms of the U and is threaded into the other, as shown in Fig. 22. There is sufficient play between the post 5 and the arms 59 and roller 60 so that the member 65 may ride up and down the post 5 freely, but the bar 55 will nevertheless be kept properly positioned with respect to the post 5. When the container engaging and lifting unit formed of bar 55 and member 56 is to be removed, and other container engaging and lifting means substituted as, for example, in substituting the container engaging and lifting means of the embodiment of Figs. 1 to 14, one merely removes the screw 66 which allows the bar 55 to swing away from the post 5 and obviates the necessity of first removing the mechanism for lifting the container, such as the sleeve 34 and the lifting lever carried thereby.

It is believed that the operation of both embodiments of the invention will be apparent from the foregoing description, but will briefly be reviewed. When a container such as the drum A in Figs. 1 to 14 is to be transported, the container engaging and lifting mechanism in Figs. 1 to 14 is particularly useful, but it will be understood that the mechanism of the type shown in Figs. 18 to 24 may also be used for handling drum type containers such as A. The operator merely positions the vehicle or truck in embracing relation to the container A as shown in Fig. 1, it being understood that as the base is being moved into embracing relation to the container, the operator lifts the member 6 until the depending cam 25 clears the top of the drum, that is the upstanding peripheral flange thereof, and then the member 6 is dropped. The member 6 descends to the level shown in Fig. 1, after which the truck is pushed into further embracing relation with the drum until it reaches the position shown in Fig. 1.

The operator then grasps the pin 29 and swings the cam 25 clockwise in top plan, so as to throw the cam surface 27 against the inner face of the upstanding flange 14 of the drum and force the container against the nose 12. The operator next swings the locking handle 32 counter-clockwise in top plan, which locks the cam 30 against the flange 33, as shown in Fig. 6. The operator then places the handle 46 in the socket 45 of the lever 37 and pulls downwardly on the handle. This downward movement of the handle 46 rocks the lever 37 and through the cam ends 39, lifts the member 11 into engagement with the shoulder 13 on the external periphery of the drum, as shown in Fig. 7. The continued movement of the lifting lever then lifts the drum through the top flange thereof into a position such as shown in Fig. 2. The lever is then latched by the latch device 40, as shown in Fig. 3, after which the operator may remove the handle 46 and place it in socket 44 of lever 37, as shown in Figs. 2 and 3, whereupon the handle 46 serves as a convenient means to pull or push the truck with the drum A to the desired location.

The drum is lowered by reversing the elevating movement just described. After the drum is lowered, the handle 32 is rotated clockwise in top plan, to release cam 39 and flange 33, then the pin 29 is grasped and the cam 25 swung into the position shown in Fig. 4, which releases the drum. The operator then pulls the lifting device away from the drum while lifting the member 6, and this fully releases the drum. If the drum has corrugated side walls, the apron or side 51 may be first placed on the truck or base, as shown in Figs. 14–17, before the truck or base is pushed into embracing relation to the drum or container.

In using the embodiment of the invention shown in Figs. 18–24, an operator pushes the truck into embracing relation with the drum or barrel B, during which the tapered or wedge-like arm 62 at the bottom of bar 55 is forced somewhat under the bottom end of the barrel or drum, as shown in Fig. 18. The operator then forces the member 56 downwardly into the position shown in Fig. 19, after which the operator rocks the lifting lever 37 in the manner explained in connection with Figs. 1 to 14, to lift the barrel B, at which time the parts are in the position shown in Fig. 20. The barrel is carried to any new location by rolling the truck to that location, and then the barrel is lowered by reversing the elevating operations. It will be understood that the members 56 with its arcuate member 64 may have to be changed for different sizes or shapes of containers, but the principle of operation will remain the same.

It will be understood that various changes in the details, proportions and arrangements of parts, which have been herein described and illustrated in order to explain the nature of the invention, may be made by those skilled in the art within the principle and scope of the invention as expressed in the appended claims.

I claim as my invention:

1. An improved device for transporting somewhat barrel-like rigid containers of the type having an upright peripheral wall with a peripheral upstanding flange at its upper end and an outwardly and downwardly facing peripheral shoulder at a point below said flange, which comprises a base having roller supports at at least three spaced, non-alined points and having an upright standard, said base at one side of said standard being of U shape to receive and embrace within the U more than half of one of said containers to be transported, said base having one of said roller supports adjacent the free end of each arm of the U, a container-engaging unit mounted and guided for vertical movement on said standard, said unit having connected parts, one of which has a portion engageable beneath said shoulder and the other of which has a depending portion that engages with said flange on the inside face thereof, a power amplifying, mechanical device mounted on said standard separately from said unit but operable on said unit to raise it on said standard and through it raise and support any container engaged thereby for rolling transport to any desired position, and means movable into engagement with said power amplifying device to releasably lock it in position to support said container when raised.

2. An improved device for transporting somewhat barrel-like, rigid containers of the type having an upright, peripheral wall with a peripheral upstanding flange at its upper end and an outwardly and downwardly facing peripheral shoulder at a point below said flange, which comprises a base formed to receive and partially embrace a container to be transported when said base is moved across the floor into embracing relation to said container, said base having a roller support and also an upstanding frame, a container-engaging unit mounted on and guided for vertical movement by said frame, said unit having connected parts, one of which parts has a portion engageable upwardly beneath said shoulder, and the other of which parts has a depending portion that descends along the inner face of said flange and confines the top portion of said container against horizontal movement away from said frame, means mounted on said frame separately from said unit but operable on said unit to raise it on said frame and through said unit lift said container and hold it so lifted, for rolling transport with said base to any desired location, and means for securing said raising means, at different elevations on said frame to enable said container engaging unit and raising means to operate on containers of different heights.

3. An improved device for transporting somewhat barrel-like, rigid containers of the type having an upright, peripheral wall with a peripheral upstanding flange at its upper end and an outwardly and downwardly facing peripheral shoulder at a point below said flange but above the container base, which comprises a base formed to receive and partially embrace a container to be transported when said base is moved across the floor into embracing relation to said container, said base having a roller support and also an upstanding frame, a container-engaging unit mounted on and guided for vertical movement by said frame, said unit having connected parts, one of which parts has a portion engageable upwardly beneath said shoulder, and the other of which parts has a depending portion that descends along the inner face of said flange and confines the top portion of said container against horizontal movement away from said frame, said connected parts being adjustable relatively to one another vertically to engage different containers in which said shoulder and said flange are spaced apart for different distances, and means mounted on said frame separately from said unit and below said unit but operable on said unit to raise it on said frame and through said unit lift said container and hold it so lifted for rolling transport with said base to any desired location.

4. An improved device for transporting somewhat barrel-like, rigid containers of the type having an upright, peripheral wall with a peripheral upstanding flange at its upper end and an outwardly and downwardly facing peripheral shoulder at a point below said flange, which comprises a base formed to receive and partially embrace a container to be transported when said base is moved across the floor into embracing relation to said container, said base having a roller support and also an upstanding frame, a container-engaging unit mounted on and guided for vertical movement by said frame, said unit having connected parts, one of which parts has a portion engageable upwardly beneath said shoulder, and the other of which parts has a depending portion that descends along the inner face of said flange and confines the top portion of said container against horizontal movement away from said frame, said connected parts being adjustable relatively to one another vertically to engage different containers in which said shoulder and said flange are spaced apart for different distances, but said adjustment of said shoulder engaging part downwardly relatively to the flange engaging part being limited, means mounted on said frame separately from said unit but operable on said unit to raise it on said frame and through said unit lift said container and hold it so lifted, for rolling transport with said base to any desired location, and means movable into engagement with said power amplifying device to releasably lock it in position to support said container when raised.

5. An improved device for transporting somewhat barrel-like, rigid containers of the type having an upright, peripheral wall with a peripheral upstanding flange at its upper end and an outwardly and downwardly facing peripheral shoulder at a point below said flange, which comprises a base formed to receive and partially embrace a container to be transported when said base is moved across the floor into embracing relation to said container, said base having a roller support and also an upstanding frame, a container-engaging unit mounted on said frame, said unit having connected parts, one of which parts has a portion engageable upwardly beneath said shoulder, and the other of which parts has a depending portion that descends along the inner face of said flange and confines the top portion of said container against horizontal movement away from said frame, said flange engaging part being adjustable horizontally relatively to said frame so as to be engageable with flanges at different distances from said frame, and means mounted on said frame separately from said unit but operable on said unit to raise it on said frame and through said unit lift said container and hold it so lifted, for rolling transport with said base to any desired location.

6. An improved device for transporting somewhat barrel-like, rigid containers of the type having an upright, peripheral wall with a peripheral upstanding flange at its upper end and an outwardly and downwardly facing peripheral shoulder at a point below said flange, which comprises a base formed to receive and partially embrace a container to be transported when said base is moved across the floor into embracing relation to said container, said base having a roller support and also an upstanding frame, a container-engaging unit mounted on said frame, said unit having connected parts, one of which parts has a portion engageable upwardly beneath said shoulder, and the other of which parts has a depending portion that descends along the inner face of said flange and confines the top portion of said container against horizontal movement away from said frame, said flange engaging part having an arm extending in a direction away from said frame, an eccentric cam pivoted on and depending from the under face of said arm adjacent its free end for rotation to bring a peripheral zone of the cam into and out of engagement with the inner face of said flange of a container that may be embraced by said base, and means mounted on said frame separately from said unit but operable on said unit to raise it on said frame and through said unit lift said container and hold it so lifted, for rolling transport with said base to any desired location.

7. An improved device for transporting somewhat barrel-like, rigid containers of the type having an upright, peripheral wall with a peripheral upstanding flange at its upper end and an outwardly and downwardly facing peripheral shoulder at a point below said flange, which comprises a base formed to receive and partially embrace a container to be transported when said base is moved across the floor into embracing relation to said container, said base having a roller support and also an upstanding frame, a container-engaging unit mounted on said frame, said unit having connected parts, one of which parts has a portion engageable upwardly beneath said shoulder, and the other of which parts has a depending portion that descends along the inner face of said flange and confines the top portion of said container against horizontal movement away from said frame, said flange engaging part having an arm extending in a direction away from said frame, an eccentric cam pivoted on and depending from the under face of said arm adjacent its free end for rotation to bring a peripheral zone of the cam into and out of engagement with the inner face of said flange of a container that may be embraced by said base, and means mounted on said frame separate from said unit but operable on said unit to raise it on said frame and through said unit lift said container and hold it so lifted, for rolling transport with said base to any desired location, said cam having an operating arm extending horizontally away from its pivot, another eccentric cam pivoted to the free end of said operating arm, said first-mentioned arm having an arcuate surface along which said second cam moves as said second cam swings with said operating arm into different flange engaging positions for said first cam, whereby engagement of said second cam, by its individual rotation on its own axis, with said arcuate surface locks said first cam in any of a plurality of different possible flange engaging positions of said first cam.

8. An improved device for transporting somewhat barrel-like, rigid containers of the type having an upright, peripheral wall with a peripheral upstanding flange at its upper end and an outwardly and downwardly facing peripheral shoulder at a point below said flange, which comprises a base formed to receive and partially embrace a container to be transported when said base is moved across the floor into embracing relation to said container, said base having a roller support and also an upstanding frame, a container-engaging unit mounted on said frame, said unit having connected parts, one of which parts has a portion engageable upwardly beneath said shoulder, and the other of which parts has a depending portion that descends along the inner face of said flange and confines the top portion of said container against horizontal movement away from said frame, said flange engaging part having a multi-sectional arm extending in a direction away from said frame, with said sections adjustable relatively to one another to extend different distances away from said frame, an eccentric cam pivoted on the outer section of said arm, adjacent its free end, for rotation to bring a peripheral zone of said cam progressively into and out of engagement with the inner face of said flange of a container that may be embraced by said base, and means mounted on said frame separately from said unit but operable on said unit to raise it on said frame and through said unit lift said container and hold it so lifted, for rolling transport with said base to any desired location.

9. An improved device for transporting somewhat barrel-like, rigid containers of the type having an upright, peripheral wall with a peripheral upstanding flange at its upper end and an outwardly and downwardly facing peripheral shoulder at a point below said flange, which comprises a base formed to receive and partially embrace a container to be transported when said base is moved across the floor into embracing relation to said container, said base having a roller support and also an upstanding frame, a container-engaging unit mounted on said frame, said unit having connected parts, one of which parts has a portion engageable upwardly beneath said shoulder, and the other of which parts has a depending portion that descends along the inner face of said flange and confines the top portion of said container against horizontal movement away from said frame, said flange engaging part having a multi-sectional arm extending in a direction away from said frame, with said sections adjustable relatively to one another to extend different distances away from said frame, an eccentric cam pivoted on the outer section of said arm, adjacent its free end, for rotation to bring a peripheral zone of said cam progressively into and out of engagement with the inner face of said flange of a container that may be embraced by said base, means for releasably locking said cam in any of a plurality of different possible flange engaging positions into which the cam may be moved, and means mounted on said frame separately from said unit but operable on said unit to raise it on said frame and through said unit lift said container and hold it so lifted, for rolling transport with said base to any desired location.

10. An improved device for transporting somewhat barrel-like rigid containers of the type having an upright peripheral wall with a peripheral upstanding flange at its upper end and an outwardly and downwardly facing peripheral shoulder at a point below said flange, which comprises a base having roller supports and an upright, rigidly secured standard, a container engaging unit having connected parts, one of which parts has a portion engageable upwardly beneath said shoulder and the other of which parts has a depending portion that descends along the inner face of said flange and confines the top portion of said container against horizontal movement away from said standard, said flange engaging part also having a loop extending therefrom in a direction away from the flange engaging portion and through the eye of which loop said standard is received and by which said unit is guided vertically along said standard, said unit having an abutment, and means mounted on said standard separately from said unit but operable on said abutment to raise said unit, and through it raise and support a container which said parts may engage for rolling transport to any desired location.

11. An improved device for transporting somewhat barrel-like rigid containers of the type having an upright peripheral wall with a peripheral upstanding flange at its upper end and an outwardly and downwardly facing peripheral shoulder at a point below said flange, which comprises a base formed to receive and partially embrace a container to be transported, said base having a roller support and an upstanding frame, means mounted on said frame for vertical movement thereon and operable for engaging and lifting a container with which said base may be in embracing relation, said means having a lifting abutment, a lever pivotally mounted on said frame separately from said container engaging means, but engageable beneath said abutment to lift it and through it lift and hold lifted said container engaging means and any container engaged thereby, means for latching the lever in a position which it occupies when a container is lifted thereby, said lever having a pair of sockets at its free end opening approximately radially and outwardly from its pivoted axis, the axes of such sockets making an acute angle to one another, and a handle removably and releasably secured alternately in said sockets, whereby said handle may be first placed in one of said sockets while the lever is being rotated to lift a container, whereby after the lever has been rotated to lift a container and has been latched, said handle may be removed from said one socket and placed in the other of said sockets so as to project more nearly horizontally from the frame and thereby be more easily grasped as a handle to draw said base and standard with any container supported thereby, across the floor to any new location.

12. An improved device for transporting somewhat barrel-like, rigid containers of the type having an upright, peripheral wall with a peripheral upstanding flange at its upper end and an outwardly and downwardly facing peripheral shoulder at a point below said flange, which comprises a base formed to receive and partially embrace a container to be transported when said base is moved across the floor into embracing relation to said container, said base having a roller support and also an upstanding frame, a container-engaging unit mounted on and guided for vertical movement by said frame, a lever hinged on said frame separately from said unit and engageable with said unit to lift the same and through it any container engaged thereby, means for latching the lever in a position it occupies when the container is lifted, said lever having a plurality of sockets opening somewhat radially and outwardly from its free end, but with the axes of the sockets making acute angles to one another, a handle removably receivable in either of said sockets and releasably held therein, whereby said handle may be placed in one of said sockets and the lever turned into a position in which the container is lifted, and the lever latched and then the handle removed and inserted in the other of said sockets to extend in a direction more nearly horizontal to serve as a handle by which the device may be drawn about in shifting a container from one location to another.

13. An improved device for transporting somewhat barrel-like, rigid containers of the type having an upright, peripheral wall with a peripheral upstanding flange at its upper end, which comprises a base formed to receive and partially embrace a container to be transported when said base is moved across the floor into embracing relation to said container, said base having a roller support and also an upstanding frame, an L-shaped bar disposed upright along said frame, means carried by the upright arm of said bar and slidably guided by said frame for vertical movement thereon, the lower or base arm of the L being tapered toward its free end and being approximately horizontal so as to touch approximately the floor and be wedged under the bottom of a container at the periphery of the container, a member carried by the upper end of said bar, adjustable vertically thereon, and having a portion extending forwardly and then depending to engage the inner face of said flange and confine the upper end of said container against movement away from said bar, said member also having a loop portion projecting laterally therefrom and engageable with a portion of said standard for sliding vertical movement thereon, said bar also having an abutment, and means mounted on said standard separately from said bar and engageable beneath said abutment for lifting said bar and through it said container, and for holding the container lifted while the base and container are rolled together to a new location.

14. An improved device for transporting somewhat barrel-like, rigid containers of the type having an upright, peripheral wall with a peripheral upstanding flange at its upper end and an outwardly and downwardly facing peripheral shoulder at a point below said flange, which comprises a base formed to receive and partially embrace a container to be transported when said base is moved across the floor into embracing relation to said container, said base having a roller support and also an upstanding frame, a member mounted on said upstanding frame for vertical sliding movement thereon, said member having an arm extending forwardly therefrom over any container in embracing relation to said base, then having a depending portion at the free end thereof to depend along the inner face of said flange and limit movement of the upper end of said container away from said frame, a second member supported by the first member and depending therefrom, said second member having a forwardly extending arm to engage beneath said shoulder of said container when said container is received by said base, means mounted on said frame separately from said members but operable on said second member to raise it and through it said container and to hold said container so lifted while said base is rolled from one location to another.

15. An improved device for transporting somewhat barrel-like, rigid containers of the type having an upright, peripheral wall with a peripheral upstanding flange at its upper end and an outwardly and downwardly facing peripheral shoulder at a point below said flange, which comprises a base formed to receive and partially embrace a container to be transported when said base is moved across the floor into embracing relation to said container, said base having a roller support and also an upstanding frame, means slidable vertically on said frame and releasably engageable with a container that may be embraced by said base, means also carried by said frame separately from said container engaging means and operable on the latter to lift it on said frame and hold it lifted, and rollers carried by said base and abutting the side wall of any container received in embracing relation by said base so as to guide said container upwardly and downwardly with a minimum of friction.

16. An improved device for transporting somewhat barrel-like, rigid containers of the type having an upright, peripheral wall with a peripheral upstanding flange at its upper end and an outwardly and downwardly facing peripheral shoulder at a point below said flange, which comprises a base formed to receive and partially embrace a container to be transported when said base is moved across the floor into embracing relation to said container, said base having a roller support and also an upstanding frame, means slidable vertically on said frame and releasably engageable with a container that may be embraced by said base, means also carried by said frame separately from said container engaging means and operable on the latter to lift it on said frame and hold it lifted, rollers carried by said base and abutting the side wall of any container received in embracing relation by said base so as to guide said container upwardly and downwardly with a minimum of friction, and a shield releasably mounted on said frame so as to depend in front of said roller when said device is to be used with containers having an undulatory periphery adjacent its lower end.

17. An improved device for transporting somewhat barrel-like, rigid containers of the type having an upright, peripheral wall with a peripheral upstanding flange at its upper end and an outwardly and downwardly facing peripheral shoulder at a point below said flange, which comprises a base formed to receive and partially embrace a container to be transported when said base is moved across the floor into embracing relation to said container, said base having a roller support and also an upstanding frame, a container-engaging unit mounted on and guided for vertical movement by said frame, said unit having connected parts, one of which parts has a portion engageable upwardly beneath said shoulder, and the other of which parts has a depending portion that descends along the inner face of said flange and confines the top portion of said container against horizontal movement away from said frame, a lever hinged on said frame separately from said unit but operable when swung to engage said unit and lift it vertically, and means for releasably latching said lever and said container in the position in which said container will be held lifted, while said base with container may be rolled to a new location.

18. An improved device for transporting barrel-like, rigid containers from one location to another which comprises a vehicle having supporting rollers and an upright portion, means on said upright portion for engaging a container to be transported, adjacent the periphery of the container and lifting it relatively to said vehicle, a lever hinged on the upstanding portion of said vehicle and operable on said container engaging and lifting means to lift the container when the lever is rocked vertically, said lever having a plurality of sockets in its free end opening outwardly and somewhat radially to the pivot of the lever, but with the axes of said sockets making acute angles to one another, means for latching said lever in container lifted position, and a handle removably and releasably receivable in said sockets selectively whereby it may be placed in one of said sockets and rocked to cause a lifting of said container, and then removed from that socket and placed in the other socket which then may be more convenient for use as a handle by which to move said vehicle from one location to another.

19. An improved device for transporting somewhat barrel-like, rigid containers of the type having an upright, peripheral wall with a peripheral upstanding flange at its upper end and an outwardly and downwardly facing peripheral shoulder at a point below said flange, which comprises a base formed to receive and partially embrace a container to be transported when said base is moved across the floor into embracing relation to said container, said base having a roller support and also an upstanding frame, a member mounted on said frame for vertical movement thereon to different elevations, said member having a depending arm and a forwardly extending arm at the side of the frame towards which a container is received while in said container embracing relation, an abutment element slidably mounted on said depending arm and having a forwardly extending nose adjacent its upper end to engage beneath said shoulder of any container embraced by said base and exert a lifting force thereon, said forwardly extending arm having an aperture vertically therethrough, a screw slidable vertically in said aperture and threaded into said element, said screw having a head engaging with said forwardly extending arm for limiting its downward movement through said aperture, means carried by the free end of said horizontally extending arm for engaging the inner face of said flange of an embraced container and confining that container to the frame with said shoulder above said nose, and means mounted on said frame separately from said member for forcing said element upwardly and thereby lifting the container and holding it lifted while the base and the container supported thereby are rolled to a new location.

20. An improved device for transporting somewhat barrel-like, rigid containers of the type having an upright, peripheral wall with a peripheral upstanding flange at its upper end and an outwardly and downwardly facing peripheral shoulder at a point below said flange, which comprises a base formed to receive and partially embrace a container to be transported when said base is moved across the floor into embracing relation to said container, said base having a roller support and also an upstanding frame, a member mounted on said frame for vertical movement thereon to different elevations, said member having a depending arm and a forwardly extending arm at the side of the frame towards which a container is received while in said container embracing relation, an abutment element slidably mounted on said depending arm and having a forwardly extending nose adjacent its upper end to engage beneath said shoulder of any container embraced by said base and exert a lifting force thereon, said forwardly extending arm having an aperture vertically therethrough, a screw slidable vertically in said aperture and threaded into said element, said screw having a head engaging with said forwardly extending arm for limiting its downward movement through said aperture, means carried by the horizontally extending arm for engaging the inner face of said flange of any container in embracing relation to the base, and operable to force said flange toward said frame and shift the container against said nose and with said shoulder over said nose, and means mounted on said frame separately from said member for forcing said element upwardly and thereby lifting the container and holding it lifted while the base and the container supported thereby are rolled to a new location.

CHARLES F. ERNST.